US012506741B2

(12) United States Patent
Berko et al.

(10) Patent No.: US 12,506,741 B2
(45) Date of Patent: *Dec. 23, 2025

(54) GENERATION OF THE DIGITAL FINGERPRINTS LIBRARY WITH HIERARCHICAL STRUCTURE

(71) Applicant: Acronis International GmbH, Schaffhausen (CH)

(72) Inventors: Nickolay Berko, Schaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 349 days.

This patent is subject to a terminal disclaimer.

(21) Appl. No.: 17/936,414

(22) Filed: Sep. 29, 2022

(65) Prior Publication Data

US 2024/0114034 A1    Apr. 4, 2024

(51) Int. Cl.
*H04L 9/40*    (2022.01)

(52) U.S. Cl.
CPC ........ *H04L 63/105* (2013.01); *H04L 63/0876* (2013.01)

(58) Field of Classification Search
CPC .......................... H04L 63/105; H04L 63/0876
See application file for complete search history.

(56) References Cited

U.S. PATENT DOCUMENTS

| | | | |
|---|---|---|---|
| 7,707,427 B1 * | 4/2010 | Kenrich ............... | H04L 9/3236 380/37 |
| 7,809,888 B1 * | 10/2010 | Clark ................ | G06F 12/0871 711/216 |
| 8,312,023 B2 | 11/2012 | Shields et al. | |
| 8,612,754 B2 * | 12/2013 | Norton .............. | G06F 21/6245 707/694 |
| 9,348,985 B2 * | 5/2016 | Davis ................ | G06F 21/316 |
| 10,387,265 B1 | 8/2019 | Pogosyan et al. | |
| 10,409,984 B1 * | 9/2019 | McCauley .......... | G06F 21/55 |
| 10,454,691 B2 * | 10/2019 | Cambou ............. | H04L 9/3278 |
| 10,817,542 B2 | 10/2020 | Aseev et al. | |

(Continued)

FOREIGN PATENT DOCUMENTS

CN    111353301    6/2020
CN    112115116 A   12/2020

(Continued)

OTHER PUBLICATIONS

Author: Unknown "Digital Fingerprinting Technique", Acronis DeviceLock DLP & Discovery 9.0 Published: Jun. 24, 2021 (Year: 2021).*

(Continued)

*Primary Examiner* — Mohammad A Siddiqi
(74) *Attorney, Agent, or Firm* — ESPE Legal Consultancy FZ-LLC

(57) ABSTRACT

A system and method for updating a digital fingerprint library storing data fingerprints with hierarchical security classification levels. The digital fingerprint library is updated when new fingerprints are presented for inclusion in the library. When a new fingerprint matches a fingerprint in the library, the library's fingerprint is updated. When the new fingerprint does not have a match in the library, the new fingerprint is added to the library.

20 Claims, 3 Drawing Sheets

(56) References Cited

U.S. PATENT DOCUMENTS

| | | | |
|---|---|---|---|
| 11,128,654 B1* | 9/2021 | Joyce | G06F 16/955 |
| 11,386,019 B1* | 7/2022 | Chang | G06F 12/1441 |
| 11,522,885 B1* | 12/2022 | Maknickas | H04L 63/145 |
| 11,557,141 B2* | 1/2023 | Ren | G06F 40/126 |
| 2010/0205446 A1* | 8/2010 | Kenrich | H04L 63/0428 |
| | | | 713/181 |
| 2011/0252033 A1* | 10/2011 | Narang | G06F 16/325 |
| | | | 707/E17.089 |
| 2012/0124046 A1* | 5/2012 | Provenzano | G06F 3/0605 |
| | | | 707/E17.089 |
| 2012/0271853 A1* | 10/2012 | Faitelson | H04L 63/101 |
| | | | 707/783 |
| 2015/0033202 A1* | 1/2015 | Wilson | G06F 8/76 |
| | | | 717/106 |
| 2015/0324609 A1* | 11/2015 | Grubel | H04L 63/105 |
| | | | 726/26 |
| 2016/0162691 A1* | 6/2016 | Arnold | H04L 9/3247 |
| | | | 726/26 |
| 2016/0248692 A1* | 8/2016 | Kraemer | H04L 47/805 |
| 2018/0365104 A1* | 12/2018 | Huang | H03M 13/373 |
| 2020/0004980 A1* | 1/2020 | Blass | G06F 16/2465 |
| 2020/0151145 A1* | 5/2020 | Lebresne | G06F 16/1844 |
| 2021/0056085 A1* | 2/2021 | Akerib | G06F 16/221 |
| 2021/0312069 A1* | 10/2021 | Withrow | H04L 9/083 |
| 2022/0138243 A1* | 5/2022 | Palagummi | G06F 16/953 |
| | | | 707/737 |
| 2022/0237326 A1* | 7/2022 | Le Bouthillier | G06F 21/602 |
| 2022/0244947 A1* | 8/2022 | Schober | G06F 21/71 |
| 2022/0321353 A1* | 10/2022 | Firestone | H04L 9/0894 |
| 2023/0006833 A1* | 1/2023 | Stolbikov | H04L 9/3239 |
| 2023/0376461 A1* | 11/2023 | Shilane | G06F 16/116 |
| 2023/0385455 A1 | 11/2023 | Berko et al. | |
| 2024/0086333 A1* | 3/2024 | Huang | G06F 12/1036 |
| 2024/0111723 A1 | 4/2024 | Klimov et al. | |
| 2024/0111882 A1* | 4/2024 | Berko | G06F 16/137 |
| 2024/0111887 A1 | 4/2024 | Berko et al. | |
| 2024/0111901 A1 | 4/2024 | Klimov et al. | |
| 2024/0330242 A1* | 10/2024 | Mu | H04L 9/50 |

FOREIGN PATENT DOCUMENTS

| | | | | |
|---|---|---|---|---|
| CN | 112244855 A | | 1/2021 | |
| CN | 113672170 | | 11/2021 | |
| CN | 114389896 A | * | 4/2022 | |
| JP | 2000057341 A | * | 2/2000 | |
| SG | 10201801632 | | 9/2019 | |
| WO | WO-03073762 A1 | * | 9/2003 | ......... H04N 21/2541 |

OTHER PUBLICATIONS

Author: Ashley Thomas RAPID: Reputation based Approach for Improving Intrusion Detection Effectiveness, 2010 Sixth International Conference on Information Assurance and Security Published: 2010 (Year: 2010).*

* cited by examiner

System for Creation of DFL with Hierarchical Security Structure 300

System for Creation of DFL with Hierarchical Security Structure from a File 400

GENERATION OF THE DIGITAL FINGERPRINTS LIBRARY WITH HIERARCHICAL STRUCTURE

FIELD OF THE INVENTION

The present disclosure generally relates to data security. In particular, the present disclosure relates to a system and method for assigning a security classification level to creation of a library of fingerprints of fragments of a fixed size that contain information from sources that have different security classification where such classification is hierarchical, e.g., Level 0, Level 1, Level 2 or Public, Secret, Top Secret, etc.

BACKGROUND OF THE INVENTION

With the advent of digital technology and the ever-increasing value of digital assets and related constantly evolving cyber security threats, data security has become a critical issue in all aspects of computer technology. Organizations and private citizens store valuable information in their digital information systems. While a company may have internal controls to safeguard its digital assets within the corporate perimeter, once such information leaves that perimeter, it may be harder to control it.

To better manage digital assets and prevent unauthorized release of these assets, companies deploy automatic systems that detect events when certain information is about to cross corporate virtual security perimeter. One of the methods to do so is fingerprinting of known documents that contain protected data. For example, fingerprints may be created in the form of hashes of known documents that contain protected data. When an unknown file is about to cross the virtual security perimeter the fingerprint of that file is compared to the fingerprints of all known files that contain protected information. If the fingerprint of the unknown file matches one of the fingerprints of the files known to contain protected information, it is marked.

A similar problem arises when there is a need to identify files containing partial fragments that have been copied from files known to contain protected information. In that case, fingerprinting of the entire file will not be able to detect the presence of a fragment of one file within another file when even at least one symbol in these files is different.

A method and system are needed that can allow for identification of fragments of different hierarchical classification levels in unknown documents.

SUMMARY OF THE INVENTION

The present invention operates in an environment where each file has an explicit or implicit (normally—the lowest level) classification Level(i) where when i>j, the level of classification Level(i) is a higher level of classification than Level(j). These levels may have their names or be numbered. For clarity, these will be addressed as Level(0), Level(1), . . . , Level(k).

The present invention operates with the term "fingerprint." A fingerprint is a value generated based on the contents of a file such as when two fingerprints are different, with large (or overwhelming) probability the files are also different. An example of a fingerprint is a hash function including a cryptographic hash function. Usually, digital fingerprints have the same size. For a fragment of fixed length N, the fragment itself is its own fingerprint.

The present disclosure discloses the method and system of creation of a digital fingerprint library DFL of fingerprints of fragments of fixed size N, N-fragments, of files containing protected information in an environment with hierarchical data classification. The DFL is created in such a way to reflect rules of management of protected information with hierarchical information.

The use of cryptographic hash functions as fingerprints in this invention allows to create a DFL in such a way that information from the library cannot be reversed, and fragments of different security levels cannot be reconstructed even if the library is disclosed to an attacker.

In an embodiment, N-fragments of known files containing protected data are generated using the sliding window process.

DETAILED DESCRIPTION

The present disclosure relates to creation and updating of a digital fingerprint library ("DFL") that stores fingerprints of N-fragments of known documents containing protected information. The purpose of such a library is to compare fingerprints of N-fragments of an unknown document to fingerprints stored in DFL to detect protected data in an unknown file. Such inspection is needed, e.g., when an unknown file was prepared for sharing via, e.g., a communication system or copying to an external USB drive or other destination.

Figure 1:
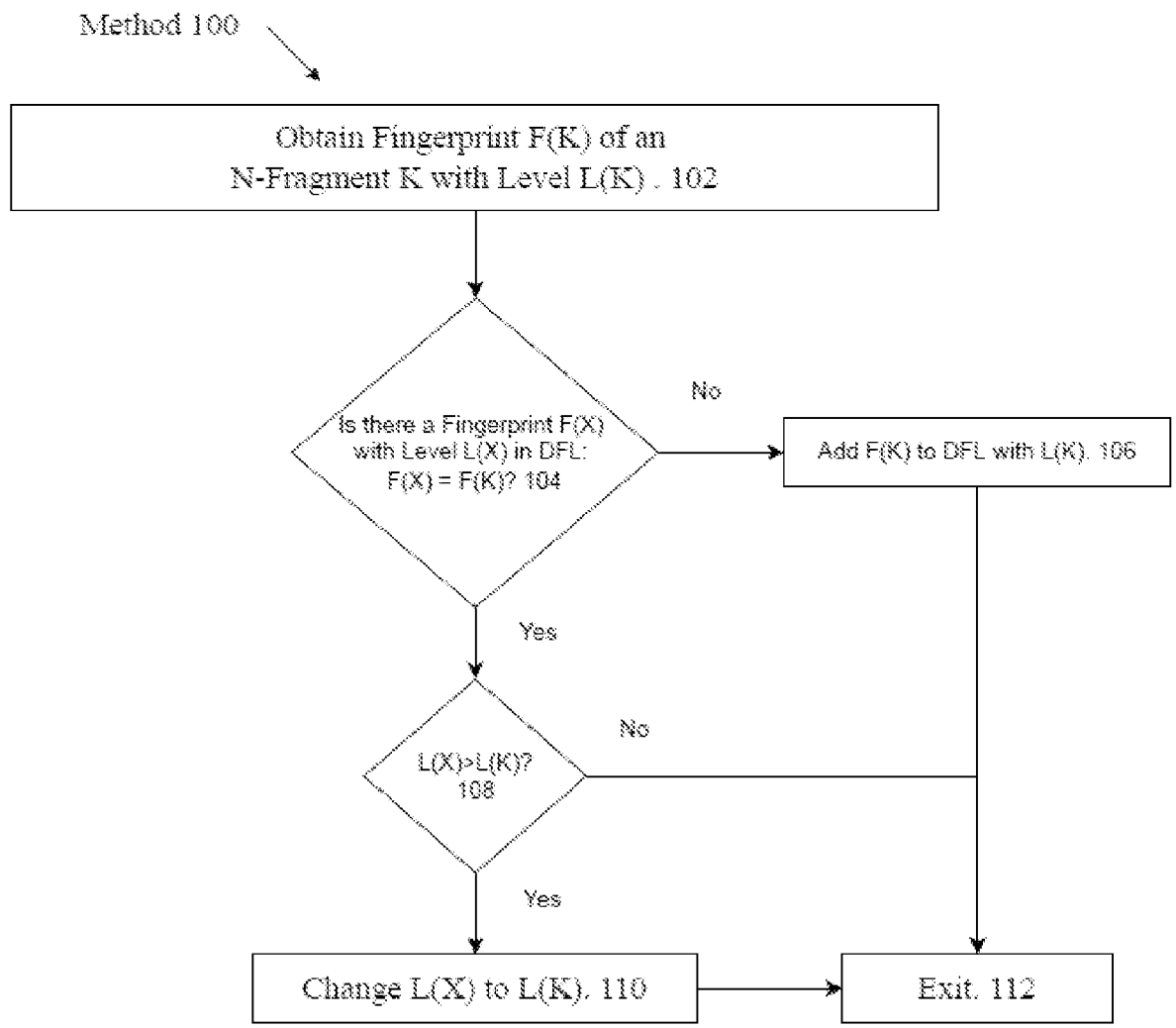
FIG. 1 depicts a block diagram of the generic method of adding a fingerprint of an N-fragment with hierarchical security level to DFL.

FIG. 1 depicts a block diagram of the process of adding fingerprint F(K) of an N-fragment K with hierarchical security level L(K) to DFL.

The first step 102 in the process is obtaining the fingerprint F(K) of an N-fragment K with security level L(K).

In an embodiment, step 102 is preceded by a step of calculating fingerprint F(K) from N-fragment K.

In an embodiment, the fingerprint F(K) of the N-fragment K is its hash value.

The next step 104 is identification of a fingerprint F(X) within DFL such that F(K)=F(X). If such a fragment does not exist, the fingerprint F(K) is added to DFL with its original security level L(K) at step 106, followed by exiting the process at step 112.

If there is a fingerprint F(X) within DFL such that F(K)=F(X), the process moves to step 108 where security levels L(K) and L(X) corresponding to fingerprints F(K) and F(X) are compared. If the security level L(X) is greater that L(K), then the signature F(X) of the N-fragment X that was previously recorded in DFL with a higher security level, was found with a lower access level L(K), and hence the security level of F(X) in DFL is lowered from L(X) to L(K) at 110.

If the security level L(X) is not greater than L(K), then the process terminates at 112.

Figure 2:
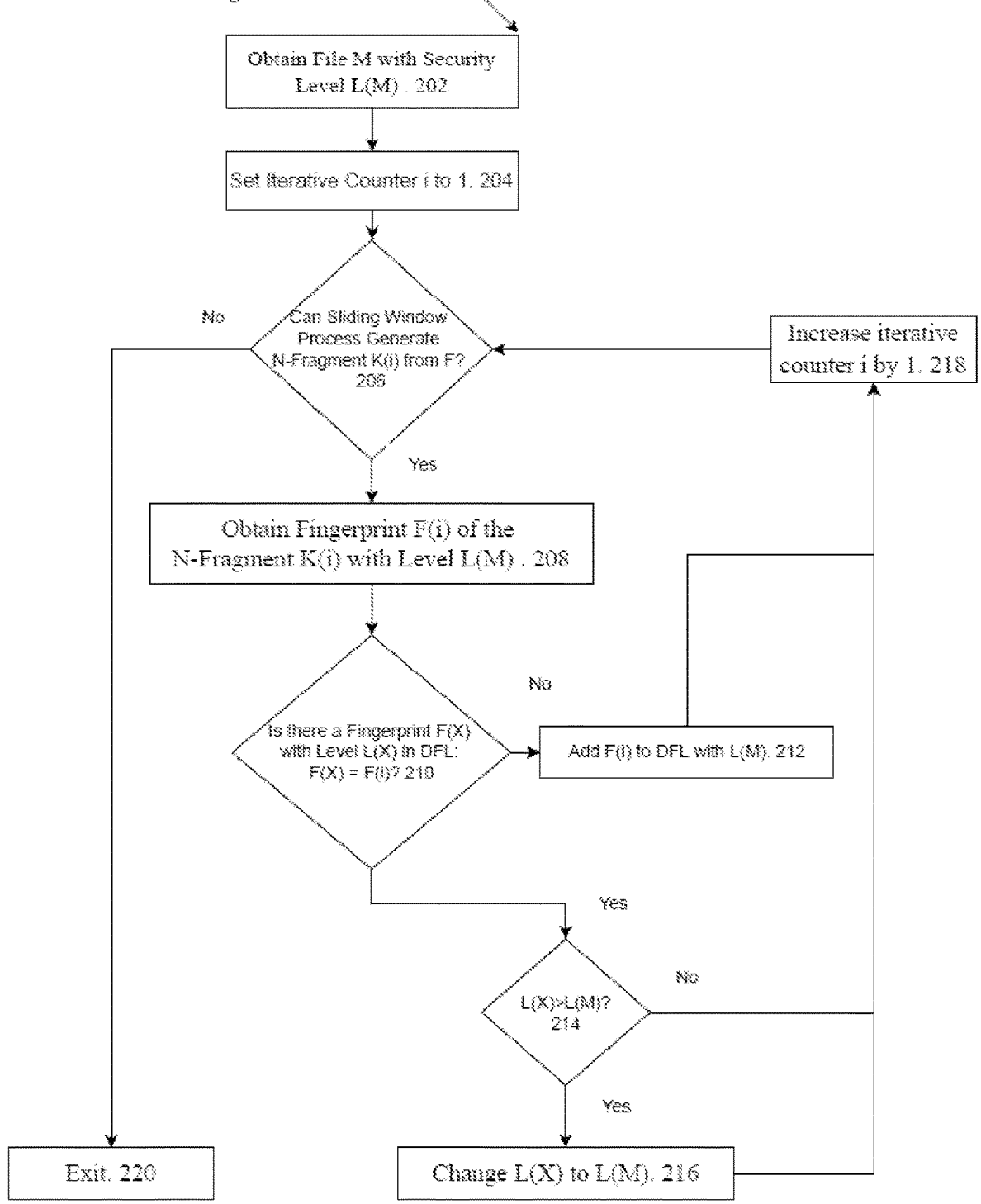
FIG. 2 depicts a block diagram of the method of adding fingerprints of N-fragments generated from a file with hierarchical security level to DFL, according to one of the embodiments.

FIG. 2 depicts a block diagram of the process of adding fingerprints of N-fragments to DFL from a file M with hierarchical data level L(M).

The process starts with obtaining the file M with security level L(M) at step 202.

In an embodiment, if the file M does not have a security level assigned to it, the lowest security level S0 is assigned to it at step 202.

In an embodiment, if the file M does not have a security level assigned to it, the file is marked for further review and the process terminates.

The iterative process begins with setting the iteration counter i to 1 at step 204.

Step 206 checks if the sliding window process can generate one more N-fragment.

If there are no more N-fragments to process, the method exits at step 220.

If the sliding window can generate another N-fragment, then the process moves to step 208.

The next step 208 in the process is generating the N-fragment K(i) that inherits the security level L(M) from the file M, obtaining the fingerprint F(i) of the N-fragment K(i) with security level L(M), and passing the fingerprint F(i) and the security level L(M) to step 210.

The next step 210 is identification of a fingerprint F(X) within DFL such that F(i)=F(X). If such a fragment does not exist, the fingerprint F(i) is added to DFL with its original security level L(M) at step 212, followed by increasing the iteration counter by one at step 218 and transferring control to step 206.

If there is a fingerprint F(X) within DFL such that F(i)=F(X), the process moves to step 214 where security levels L(M) and L(X) corresponding to fingerprints F(i) and F(X) are compared. If the security level L(X) is greater that L(M), then the fingerprint F(X) of the N-fragment X that was previously recorded in DFL with a higher security level L(X) was found with a lower access level L(M), and hence the security level for F(X) within DFL is lowered from L(X) to L(M) at 216, followed by increasing the iteration counter by 1 in step 218 and transferring the control to 206.

If the security level L(X) is not greater than L(M) in 214, then the process moves to step 218 where the iteration counter is increased by one and the control is transferred to step 206.

Figure 3:
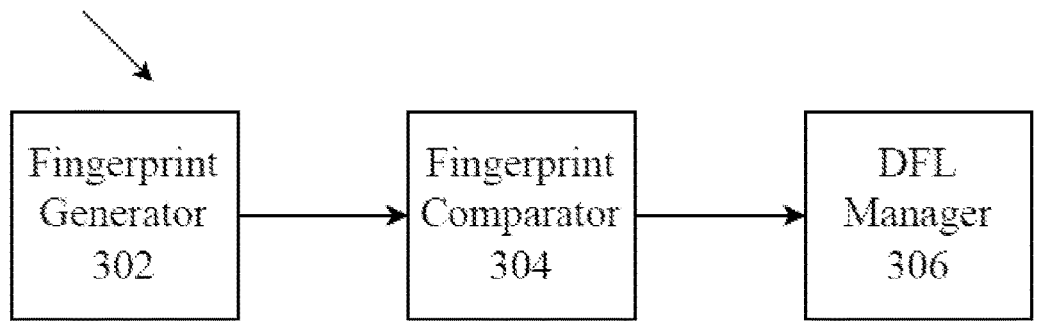
FIG. 3 depicts a block diagram of the system that implements the method of adding the fingerprint of an N-fragment with hierarchical security level to DFL.

FIG. 3 depicts a block diagram of the system 300 implementing the process of adding a fingerprint F(K) of an N-fragment K with hierarchical security level L(K) to DFL.

The system 300 consists of the Fingerprint Generator 302, the Fingerprint Comparator 304, and the DFL Manager 306.

In an embodiment, the Fingerprint Generator 302 is optional, and the Fingerprint Comparator 304 receives the information about the fragment F(K) and its hierarchical security level L(K) from another source.

The Fingerprint Generator 302 is configured to obtain an N-fragment K with security level L(K) and generate a fingerprint F(K) from that N-fragment K and to transfer it to the Fingerprint Comparator 304.

The Fingerprint Comparator 304 is configured to: identify if a fingerprint F(X) within DFL exists such that F(X)=F(K) and, if such fingerprint exists, compare its security levels L(X) to L(K).

The Fingerprint Comparator 304 is further configured to communicate to the DFL Manager 306 if there is a need to add the fingerprint F(K) with security level L(K) do DFL, update security level of F(X) from L(X) to L(K) or perform neither.

The DFL Manager 306 is configured to receive a recommendation from the Fingerprint Comparator 304 of whether there is a need to add the fingerprint F(K) with security level L(K) to DFL, update security level of F(X) from L(X) to L(K) or perform neither.

In an embodiment, the DFL Manager 306 is further configured to perform the recommended task (e.g. the recommendation from the Fingerprint Comparator 304).

Figure 4:
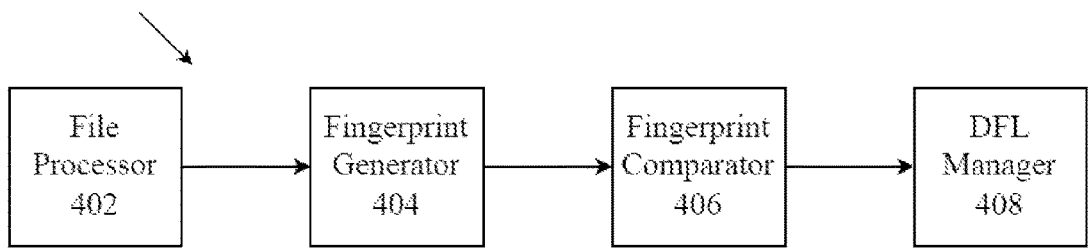
FIG. 4 depicts a block diagram of the system that implements the method of adding to DFL of fingerprints of N-fragments generated from a file with hierarchical security level.

FIG. 4 depicts a block diagram of the system 400 implementing the process of adding fingerprints F(i) of N-fragments K(i) generated from a file M with hierarchical security level L(M) to DFL.

The system 400 consists of File Processor 402, Fingerprint Generator 404, the Fingerprint Comparator 406, and DFL Manager 408.

The File Processor 402 is configured to obtain a file M with a hierarchical security level L(M) and to generate N-fragments K(i), each fragment K(i) with the security level L(M) inherited from the file M.

In an embodiment, if the file M has no assigned security level, the File Processor 402 is configured to assign the lowest security level L0 to the security level L(M).

The Fingerprint Generator 404 is configured to obtain from the File Processor 402 an N-fragment K(i) that inherits the security level L(M) from the file M and to generate a fingerprint F(i) from the N-fragment K(i) and to transfer it along with the security level L(M) to the Fingerprint Comparator 406.

The Fingerprint Comparator 406 is configured to: identify if a fingerprint F(X) exists within DFL such that F(X)=F(i) and, if such fingerprint exists, compare its hierarchical security levels L(X) to L(M).

The Fingerprint Comparator 406 is further configured to communicate to the DFL Manager 408 if there is a need to add the fingerprint F(i) with security level L(M) to DFL, update security level of F(X) to L(M) or perform neither.

The DFL Manager 408 is configured to receive a recommendation from the Fingerprint Comparator 406 of whether there is a need to add the fingerprint F(i) with security level L(M) to DFL, update security level of F(X) to L(M) or perform neither.

In an embodiment, the DFL Manager 408 is configured to perform the recommended task (e.g. the recommendation from the Fingerprint Comparator 406).

The invention claimed is:

1. A computer-implemented method for adding a digital fingerprint of digital data to a digital fingerprint library (DFL) without accessing the content of the digital data, the method comprising:
   providing a source of unknown digital data comprising a first fingerprint of digital data with a first hierarchical security level, wherein the first hierarchical security level is inherited from a file from which the unknown digital data is derived;
   accessing a DFL comprising a non-transitory storage medium containing a plurality of second fingerprints and corresponding second fingerprint hierarchical security levels;
   searching for a second fingerprint in the DFL that matches the first fingerprint;
   if the second fingerprint is found in the DFL that matches the first fingerprint, comparing the first hierarchical security level of the first fingerprint to the second hierarchical security level corresponding to the second fingerprint;

setting the second hierarchical security level to match the first hierarchical security level if the first hierarchical security level is lower than the second hierarchical security level, by storing, in a DFL record corresponding to the second hierarchical security level, a value associated with the first hierarchical security level in the non-transitory storage medium;

if the second fingerprint is not found in the DFL that matches the first fingerprint, adding the first fingerprint to the DFL with the first hierarchical security level, by storing, in a DFL record corresponding to the first hierarchical security level a value associated with the first hierarchical security level in the non-transitory storage medium, wherein the first hierarchical security level and the second hierarchical security level are defined by a classification of content of protected data; and iterating through the entire file for a plurality of fingerprints, each of the plurality of fingerprints corresponding to a new first fingerprint, wherein the searching, the comparing, the setting, and the adding are executed for the new first fingerprint.

2. The method of claim 1, wherein the first and second fingerprints are hash values.

3. The method of claim 1, wherein the source of unknown digital data comprises a first fragment from which the first fingerprint was generated.

4. The method of claim 1, wherein the DFL comprises a second fragment from which the second fingerprint was generated.

5. The method of claim 1, wherein the unknown digital data is the file and the first fingerprint is a hash of the file.

6. The method of claim 5, wherein the unknown digital data comprises a fragment and the first fingerprint is a hash of the fragment.

7. A system for storing digital data without accessing the content of the digital data, the system comprising:
   a source of unknown digital data comprising an unknown digital fingerprint having a first hierarchical security level inherited from a file from which the unknown digital data is derived; and
   a digital fingerprint library ("DFL") in a storage medium comprising a plurality of stored digital fingerprints of digital data with corresponding security levels;
   wherein the DFL is configured to store the unknown digital fingerprint when there is no stored digital fingerprint that matches the unknown digital fingerprint by adding a record in the storage medium corresponding to the unknown digital fingerprint and adding a record in the storage medium corresponding to the first hierarchical security level, the record corresponding to the unknown digital fingerprint associated with the record corresponding to the first hierarchical security level, and wherein the DFL is configured to adjust the security level of a stored digital fingerprint to match the security level of the unknown digital fingerprint when the stored digital fingerprint matches the unknown digital fingerprint and the security level of the matching stored digital fingerprint is greater than the security level of the unknown digital fingerprint, by modifying a record in the storage medium corresponding to the stored digital fingerprint and modifying a record in the storage medium corresponding to the security level of the matching stored digital fingerprint, wherein the first hierarchical security level and the second hierarchical security level are defined by a classification of content of protected data, wherein the system is further configured to iterate through the entire file for a plurality of new unknown digital fingerprints, each of the plurality of unknown digital fingerprints corresponding to a new unknown digital fingerprint, wherein the DFL is configured to store and configured to adjust the security level for the new unknown digital fingerprint.

8. The system of claim 7, wherein the unknown and stored fingerprints are hash values.

9. The system of claim 7, wherein the source of unknown digital data comprises a first fragment from which the unknown fingerprint was generated.

10. The system of claim 7, wherein the DFL comprises a second fragment from which the stored fingerprint was generated.

11. The system of claim 7, wherein the unknown digital data comprises the file and the unknown digital fingerprint is a hash of the file.

12. The system of claim 7, wherein the unknown digital data comprises a fragment and the unknown digital fingerprint is a hash of the fragment.

13. The system of claim 7, wherein the DFL is further configured to accept the unknown digital fingerprint only if no stored digital fingerprint is found in the DFL that matches the first fingerprint.

14. A computer-implemented method for adding a digital fingerprint of digital data to a digital fingerprint library (DFL) without accessing the content of the digital data, the method comprising:
   obtaining a source of unknown digital data content comprising a first fragment;
   generating from the first fragment a first fingerprint with a first hierarchical security level, wherein the first hierarchical security level is inherited from a file from which the unknown digital data is derived;
   accessing the digital fingerprint library (DFL) comprising a non-transitory storage medium containing a plurality of second fingerprints and corresponding second fingerprint hierarchical security levels;
   searching for a second fingerprint in the DFL that matches the first fingerprint;
   if the second fingerprint is found in the DFL that matches the first fingerprint, comparing the first hierarchical security level of the first fingerprint to the second hierarchical security level corresponding to the second fingerprint;
   setting the second hierarchical security level to match the first hierarchical security level if the first hierarchical security level is lower than the second hierarchical security level, by storing, in a DFL record corresponding to the second hierarchical security level, a value associated with the first hierarchical security level in the non-transitory storage medium;
   if the second fingerprint is not found in the DFL that matches the first fingerprint, adding the first fingerprint to the DFL with the first hierarchical security level, by storing, in a DFL record corresponding to the first hierarchical security level a value associated with the first hierarchical security level in the non-transitory storage medium,
   wherein the first hierarchical security level and the second hierarchical security level are defined by a classification of content of protected data; and iterating through the entire file for a plurality of fingerprints, each of the plurality of fingerprints corresponding to a new first fingerprint, wherein the searching, the comparing, the setting, and the adding are executed for the new first fingerprint.

15. The method of claim 14, wherein the first and second fingerprints are hash values.

16. The method of claim 14, wherein the source of unknown digital data comprises a first fragment from which the first fingerprint was generated.

17. The method of claim 14, wherein the DFL comprises a second fragment from which the second fingerprint was generated.

18. The method of claim 14, wherein unknown digital data is the file comprising the first fragment.

19. The method of claim 14, wherein the unknown digital data comprises a plurality of fragments.

20. The method of claim 14, wherein the first fingerprint is added to the DFL only if no second fingerprint is found that matches the first fingerprint.

\* \* \* \* \*